INVENTOR.
MORRIS MACGREGOR.
BY Joseph V. Colaianni
AGENT.

Sept. 29, 1964 M. MacGREGOR 3,150,873

ITEM JAM DETECTION APPARATUS

Filed March 29, 1962 6 Sheets-Sheet 2

INVENTOR.
MORRIS MACGREGOR.
BY
Joseph V. Chiaviani
AGENT.

INVENTOR.
MORRIS MACGREGOR.
BY Joseph V. Colianni
AGENT.

Sept. 29, 1964    M. MacGREGOR    3,150,873

ITEM JAM DETECTION APPARATUS

Filed March 29, 1962    6 Sheets-Sheet 4

INVENTOR.
MORRIS MACGREGOR.
BY
Joseph V. Colianni
AGENT.

INVENTOR.
MORRIS MACGREGOR.
BY Joseph V. Colaianni
AGENT.

INVENTOR.
MORRIS MAC GREGOR.
BY Joseph V. Colianni
AGENT.

3,150,873
ITEM JAM DETECTION APPARATUS

Morris MacGregor, Livonia, Mich., assignor to Burroughs Corporation, Detroit, Mich., a corporation of Michigan Filed Mar. 29, 1962, Ser. No. 183,607
10 Claims. (Cl. 271—57)

This invention relates generally to a document transport system and particularly to an item jam warning system to be used therein.

The invention provides a unique true document jam warning system which is capable of discriminating against false document jam conditions caused by bits of paper or dust which simulate a jam condition. Heretofore, the warning systems available to signal an ensuing or existing jam, condition to stop further feeding of documents along the document feed path have proved inadequate because of the system's inability to discriminate between true document jams and false ones. This inadequacy results in a large downtime for most document transporting systems. This, of course, also slows down the sorting operation and also results in an increase of overall cost for the operation.

It is therefore an object of this invention to provide a warning system which not only will determine that a false jam condition exists to prevent machine shutdown, but which will also detect true jam situations to stop further document feeding operations.

It is another object to provide a warning system which prevents damaging of the checks by the continual feeding of cards or items into previously jammed items.

It is yet another object of this invention to provide an improved document jam warning system. It is still another object to provide a true document jam detection system which is capable of use with existing high speed document transport and sorting systems.

In accordance with the above and first briefly described, the invention, as embodied in an item feeder system having a spaced pair of item detecting signal generating stations spaced along the item feed path, comprises a bisable storage device capable of assuming two stable states and which assumes a first stable state in response to a signal from a first signal generating station signifying the presence of an item between a first and second signal generating station and assumes a second stable state in response to a signal from the second segnal generating station to indicate the passage of the item thereby. There is also provided a signal delay device which is triggered by a signal from the first signal generating station and which will emit an output signal at the end of a predetermined time, unless it has been reset in response to a signal from the second signal generating station whereupon it will immediately emit an output pulse. There is also provided a first storage sensing, comparing or gating device which will interrogate the bistable storage unit upon initiation by the output pulse from the signal delay means and will emit an output pulse in response to the bistable storage device being in a state representing the presence of an item between said first and second generating station at the time established by the output pulse from said signal delay device. There is further provided a second signal delay device which is triggered in response to the output pulse from a first storage sensing, comparing or gating device and which emits an output pulse at the end of its predetermined time, unless it has been reset by a signal from the second signal generating source whereupon it will emit an output pulse in response thereto. A second storage sensing device is also provided which emits an output pulse to shut down the feeding unit and thereby prevent further items being fed along the feed path in response to the bistable storage device being in a state indicative of the presence of an item between said first and second signal generating station at the time of emission of an output pulse by the second signal delay device.

The various features and advantages of this invention will appear more clearly from the following detailed description when considered with the appended claims and the accompanying drawings wherein:

FIG. 1 is a mechanical schematic diagram of the item transport path in a sorting system;

FIG. 1*a* shows the timed relationship of two documents or items as they will exist in the document feed path;

Figure 7:
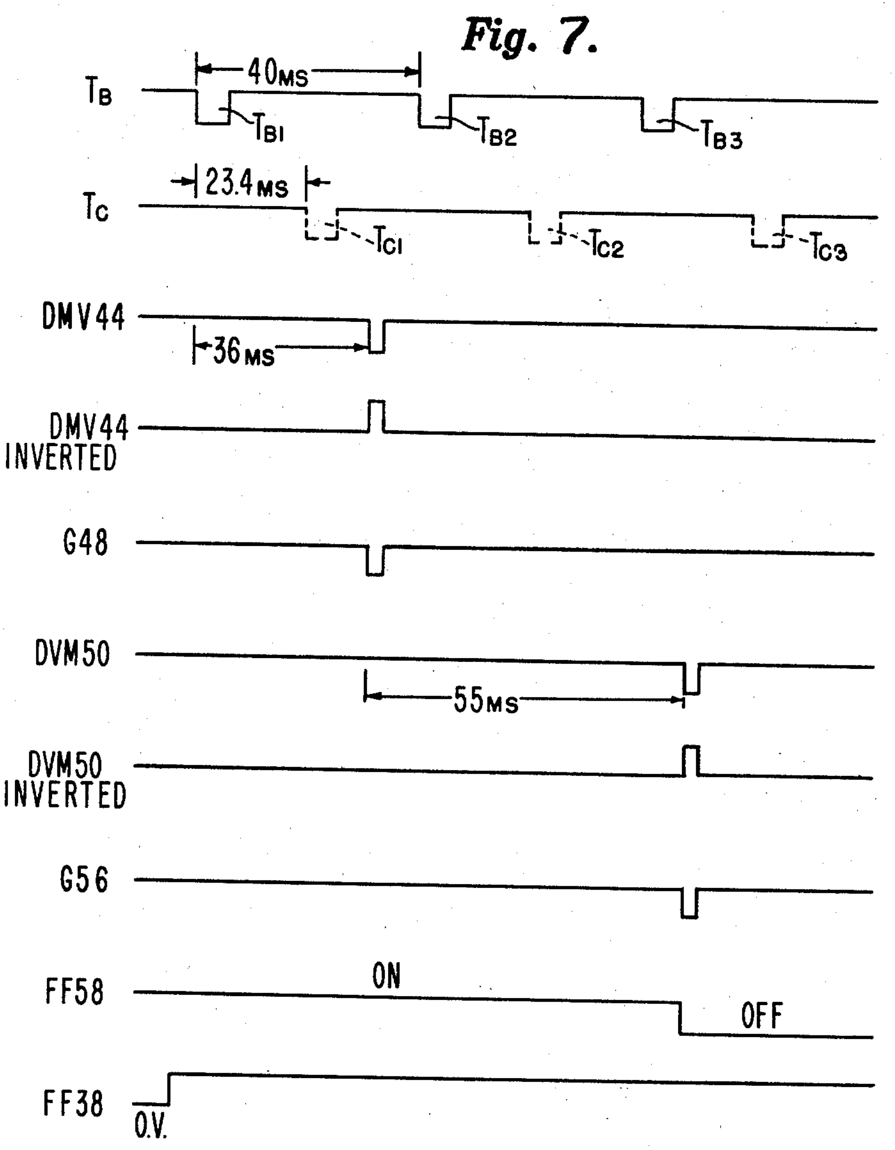
Figure 8:
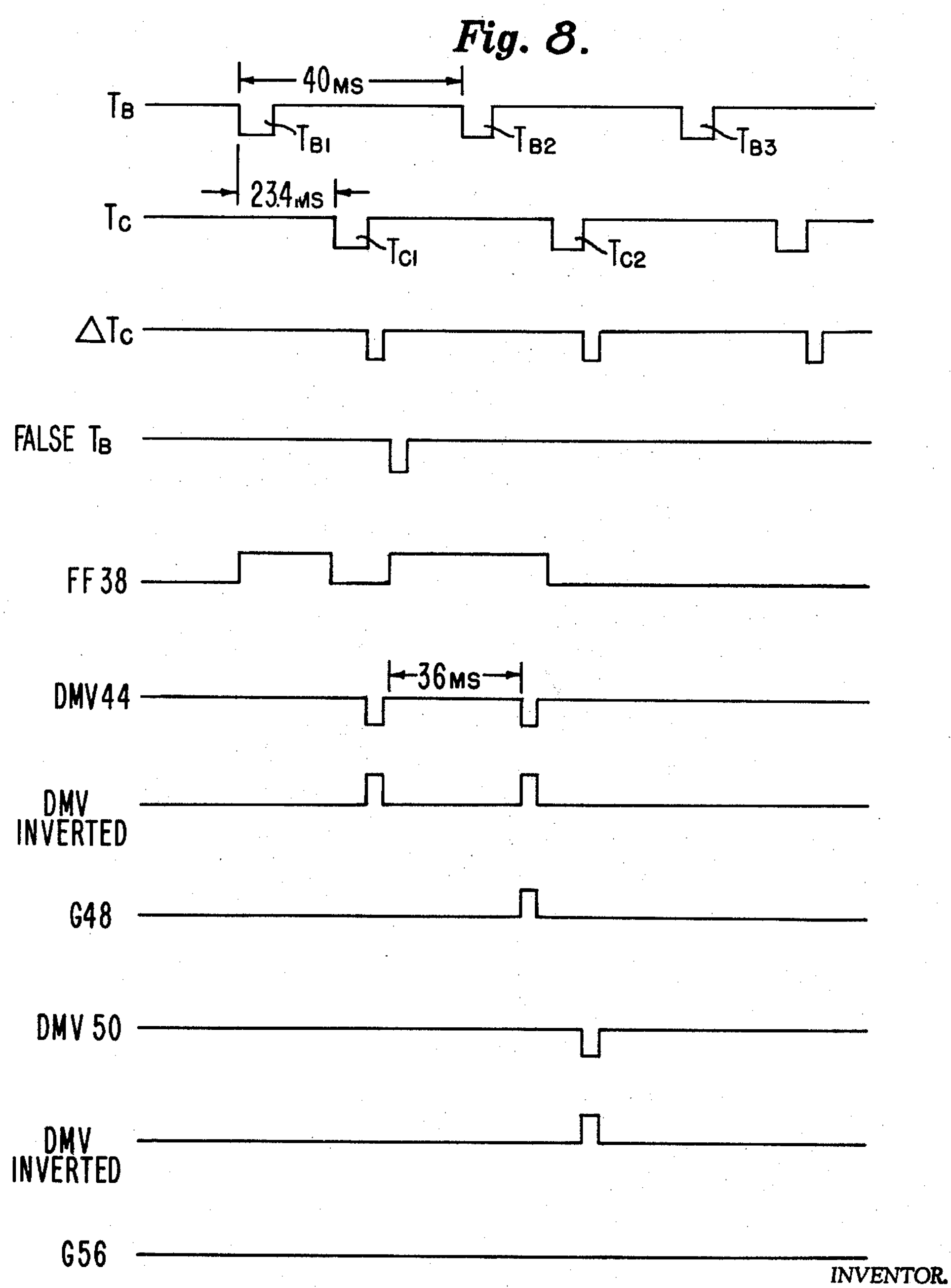

FIG. 7 is a timing diagram of the wave shapes which appear at various identified points in the system and illustrates the manner of operation of the various electrical components of the system in a true jam situation, and FIG. 8 is a timing diagram of the wave shapes which appear at various identified points of the system and illustrate the manner of operation of the various electric components in the false document jam condition.

Figures 1, 1A:
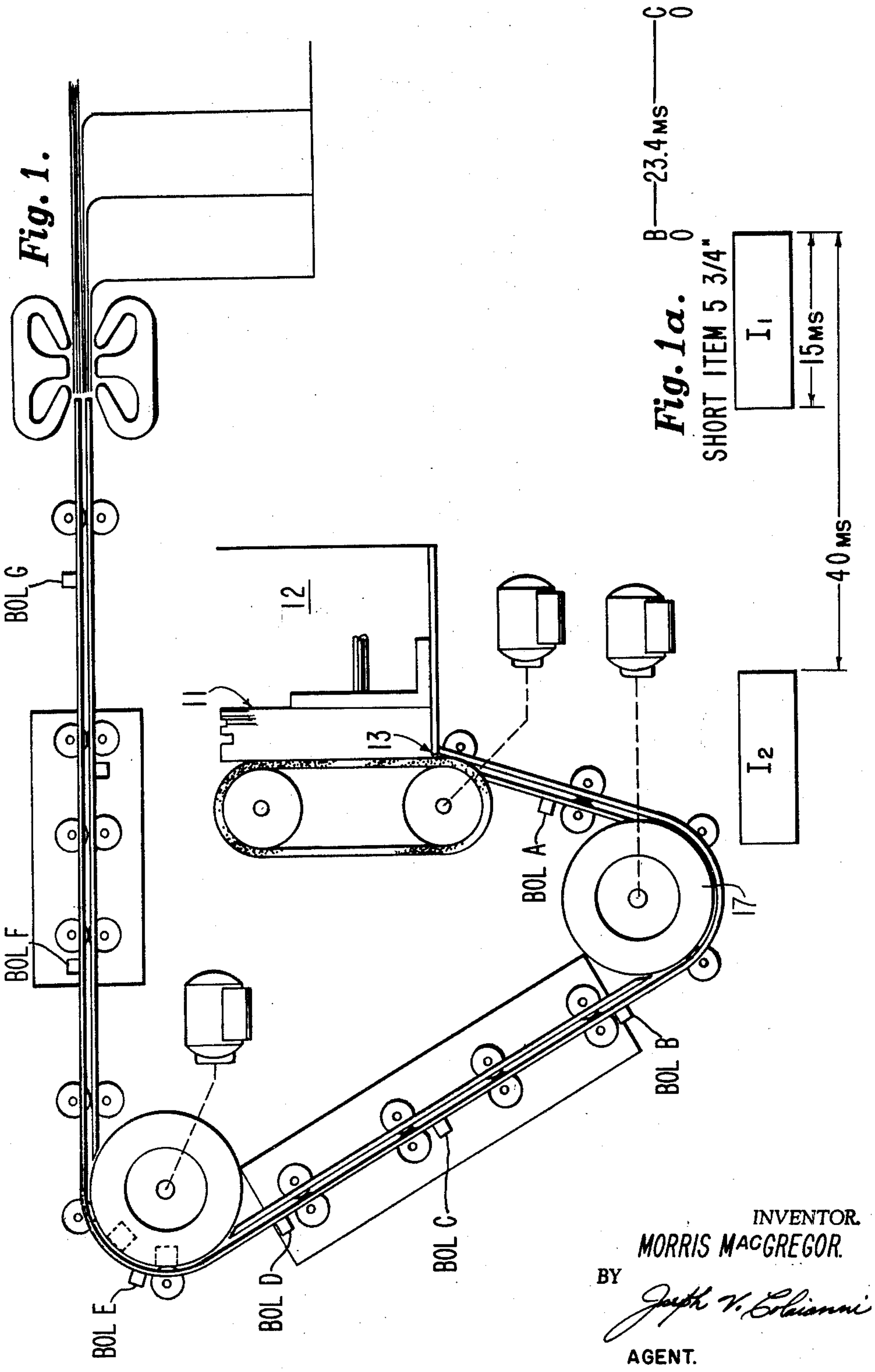

As shown in FIG. 1 the items 11 will be individually fed from an item input hopper 12 along a document transport path 13. Spaced along this document path of travel at predetermined intervals are beam of light stations $BOL_a$ to $BOL_g$, which in mechanical construction and organization may be of the type shown and described in copending application S.N. 792,293, filed February 10, 1959, in the name of James A. Ogle, now U.S. Patent 3,041,462, of common ownership herewith. These beam of light stations perform various electrical functions as explained and claimed in S.N. 861,963 filed in the name of Louis L. Tanguy, Jr., on December 24, 1959, which has matured as U.S. Patent 3,114,902, also of common ownership herewith. In this particular embodiment only beam of light stations *b*, *c*, *e* and *f* will be utilized as signal generating stations, although any number of beam of light stations spaced apart at predetermined intervals can be used. The beam of light stations are constructed and positioned such that they will respond to documents which pass thereby to generate a voltage signal. The voltage signals generated by the signal generating stations $BOL_b$ and $BOL_c$ are then fed to the logic circuit as shown in FIG. 4 for processing.

Figure 2:
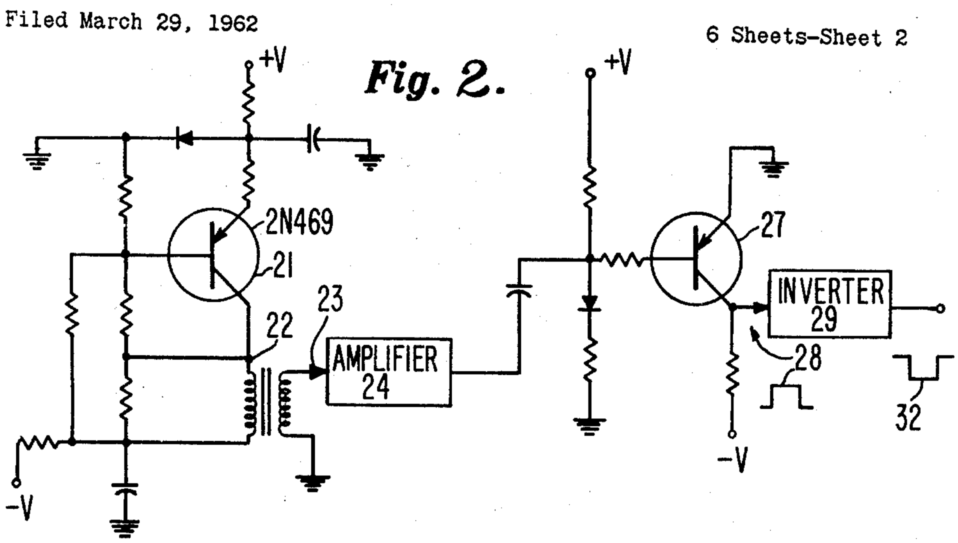
FIG. 2 is an electrical schematic circuit diagram of a beam of light or signal generating station.
Figure 3:
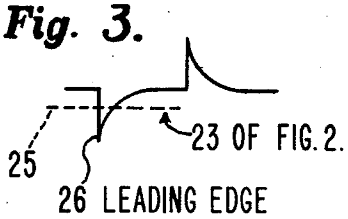
FIG. 3 is the wave form of the voltage signal developed by the beam of light circuit.

The signal generating station circuitry shown in FIG. 2 is indicative of the type employed at position BOL*b*, *c*, *e* and *f*, and include a phototransistor 21 which responds to light striking its base element. Normally light from a light source, included within the beam of light housing structure, will be striking the base of the phototransistor 21 which is also included in the housing structure, and point 22 will be at an initial voltage level. Upon the entry of an item into the path of the light, less light will be striking the base element of the phototransistor 21 and the result will be a corresponding decrease in its conduction. As a result of this decrease of conduction, point 22 experiences a negative voltage shift. Upon the passage of the item past the signal generating station, light will once again impinge upon the base of the phototransistor 21, resulting in a positive shift of the voltage level at point 22 to its initial level. FIG. 3 shows the leading and trailing edge voltage shifts as they appear at the secondary side 23 of the pulse transformer. Since the unique design employed for the true document jam detecting circuitry responds to the leading edge of the item, the description will be limited to show how signals corresponding to the leading edge of an item are generated by the signal generating stations BOL*b*, *c*, *e*, and *f*. Reference is made to the above mentioned Ogle patent for a description of signal generation from both the leading and trailing edges of an item.

After being amplified by amplifier 24, the wave form of FIG. 3 will be applied to the base of transistor 27, which is connected in a pulse standardizer pulse circuit configuration. As indicated by the supply voltages applied to the electrodes of transistor 27, it will normally be in a nonconducting state. However, as the voltage applied to its base falls below a predetermined value denoted by numeral 25 in FIG. 3, the transistor 27 conducts and goes into saturation to produce a leading edge signal 28. This leading edge signal 28 is in turn operated upon by inverter 29 to produce the leading edge signal 32. A similar signal generating circuit is present at each beam of light station positioned along the item feed path.

Figure 4:
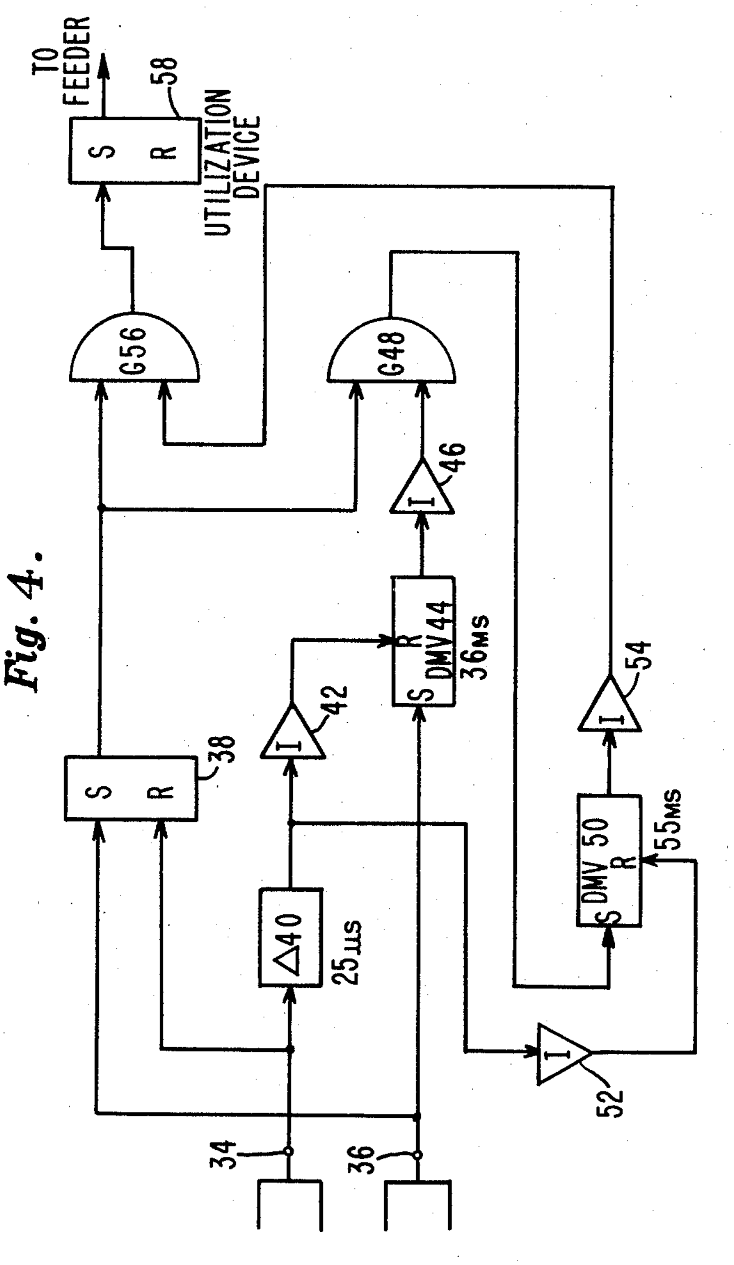
FIG. 4 is a block logic diagram of the document jam detection apparatus utilized in this invention.

FIG. 4 shows the unique logic circuitry of the invention interconnected to perform the task of not only distinguishing false item jams from true item jams to thus permit further item feeding from the item hopper 12, but also to detect a true jam and to occasion an item feeder shutdown. As shown in FIG. 4 the output signals from a pair of signal generating stations, as BOL stations *c* and *b*, are fed into terminals 34 and 36 for processing. The terminals 34 and 36 over which the signals from the signal generating station are carried are then individually and separately connected to the input terminals of the item indicating or responsive device 38. In this case a bistable circuit device, commonly referred to as a flip flop is used as the item indicating device 38 and therefore terminals 34 and 36 are respectively fed to the reset and set side of it.

Terminal 34, supplied from the BOL amplifier for station *c*, additionally is connected to signal delay device 40. The output of signal delay device 40 is then applied through an inverter 42 to the reset input terminal R of another signal delay device 44. The set side of signal delay device 44, which is its other input terminals, is directly connected to the system input terminal 36 supplied from the BOL amplifier for station *b*. In the particular embodiment employed a resettable delay monostable multivibrator is used as the signal delay device 44. However, any suitable device which accomplishes its function may be freely substituted.

The output of signal delay device 44 is then connected in circuit by way of an inverter 46 to one of the two inputs of a sensing device 48. In this particular embodiment a coincidence gate, commonly referred to as an AND gate, is used to perform the sensing operation. The output terminal of the aforesaid bistable device 38 forms the second input to the two input AND gate 48. The output of AND gate 48 is then connected to the set input side of a second signal delay device 50. The reset side of signal delay device 50 is connected by way of inverter 52 and delay 40 to the system input terminal 34.

The output terminal of signal delay device 50 in turn forms one of the inputs to another sensing device 56 and is connected thereto through an inverter 54. Sensing device 56, similar to 48, is a two-input coincidence AND gate. The output terminal of 38 is connected to the second input terminal of coincidence gate 56. The output of 56 then supplies the item feeder control circuitry denoted as utilization device 58 in FIG. 4.

As indicated above a bistable circuit device is used as the document sensing device 38. The bistable flip flop circuit employed is a transistor version of standard design, and is a two-transistor regenerative circuit which can exist indefinitely in either of its two stable states, set or reset, in response to input pulses applied to the corresponding set or reset input terminal. Upon being triggered by pulses applied to the input side indicative of the desired state, the unit will make a corresponding abrupt transition to that state, providing it is not already in that state. Of course, if the flip flop is already in the state desired, then input pulses applied to place it in the already existing state will have no effect.

Delay circuit device 40 is used to accomplish a delay in the time of appearance of an output pulse at the output terminal of the delay circuit for a predetermined time after the pulse first appeared at the input terminals of the delay circuit. This delay can be achieved by use of any of the well-known standard circuits to accomplish this end. For a thorough discussion of delay devices reference is made to chapter 10 and page 416 of the textbook by Millman and Taub, entitled Pulse and Digital Circuits, published by McGraw-Hill. In the present embodiment, a transistor delay circuit which is triggered by the rise time of the input wave form is employed to achieve a 25 microsecond delay in the device 40.

Inverters 42, 46, 52, and 54 are of standard design and serve to invert the polarity of the inputs, applied thereto. Therefore, if an input to an inverter is in a positive going direction, relative to ground, it will be changed to a negative going direction at the output terminal of the inverter. The inverter employed in the particular embodiment is a solid state variety of standard design.

Sensing devices 48 and 56 are coincidence type gates, commonly referred to as AND gates. These gates may have any number of inputs, and in this particular embodiment two inputs are provided. In this two-input variety it is necessary that two simultaneous, coexisting, positive level inputs exist before an output will occur. Any of the numerous known means of accomplishing coincidence detection of sensing may be utilized with satisfactory results.

Figure 5:
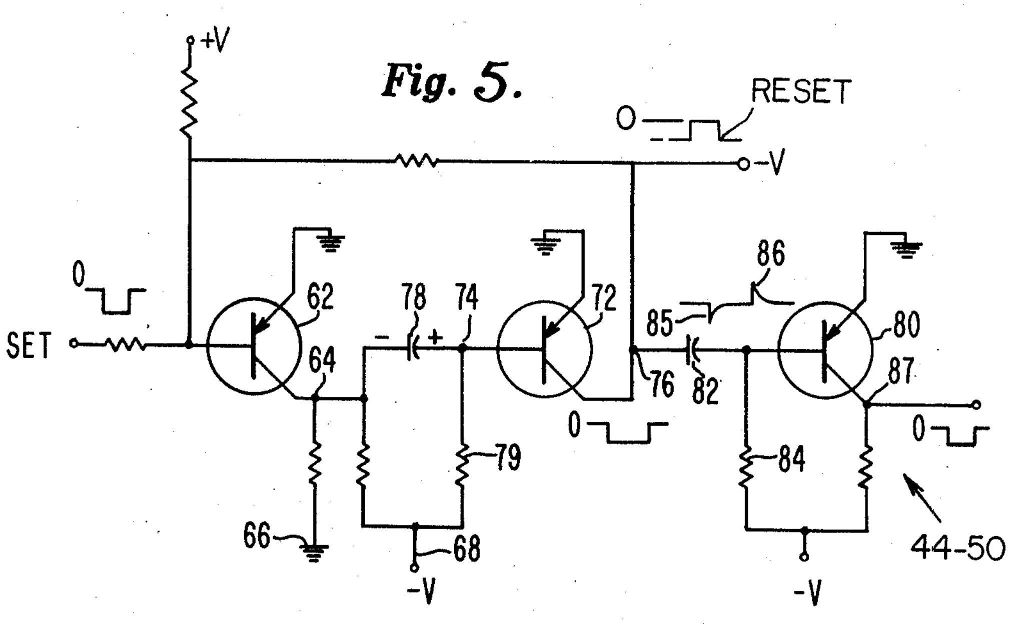
FIG. 5 is an electrical schematic diagram of the resettable delay multivibrators which are used in this invention.

As explained above, resettable delay multivibrators are used as signal delay devices 44 and 50. The circuit arrangement of the resettable delay multivibrator is shown in FIG. 5. In this particular embodiment, transistor 62 will be initially cut off and point 64 will be at some negative level due to a current flow from negative supply terminal 68 to ground point 66. At the same time transistor 72 is conducting, and therefore points 74 and 76 are at levels slightly less than ground, but at a positive level with respect to point 64. This quiescent condition results in a charge, as shown, to be stored across capacitor 78. Upon a negative going pulse with respect to ground being applied to the base of transistor 62, it will go into conduction. The conduction of 62 results in the voltage level of point 64 shifting in a positive direction. This positive shift in level will in turn be transmitted by way of capacitor 78 to the base of transistor 72 and will result in cutting transistor 72 off. With transistor 72 cut off, point 76 will shift to a negative level and will remain at that level for as long as transistor 72 remains cut off. Transistor 72 will remain cut off until the capacitor 78 discharges to a point where the potential of its base is at ground or slightly below ground. The time needed for the discharge is dependent upon the RC time constant as established by the capacitor 78 and the resistor 79.

When capacitor 78 is sufficiently discharged, transistor 72 will return to a conducting state, and thereby return the voltage level at point 76 to its initial slightly less than ground voltage level. The wave form at point 76 will thus shift from an initial level to a reduced or more negative level, and remain there for a time established by condensor 78 and resistor 79. In the present particular embodiment these values are so chosen so as to keep point 76 in its unstable negative level for 36 milliseconds in the case of signal delay device 44 and for 55 milliseconds for signal delay device 50.

Transistor 80 and its accompanying circuitry, in FIG. 5, forms a pulse standardizer circuit. Capacitor 82 and resistor 84 will differentiate the wave form at point 76 and produce spaced apart spikes 85 and 86.

The negative spike 85 will have no effect upon transistor 80 because it is already in saturation. However, transistor 80 will be cut off by positive spike 86. This results in point 87 going negative, and it will remain there until transistor 80 is turned on again. Transistor 80 will return to conduction after the positive spike 86 diminishes to substantially ground potential, and the length of time it takes for this to occur is established by capacitor 82 and resistor 84. This will result in a negative going pulse 91 of standard width being generated by the signal delay device 44 and 50 at the end of the predetermined prearranged time of 36 and 55 milliseconds respectively.

A reset terminal is also provided for in the signal delay circuits 44 and 50. This terminal will apply positive signals to the collector of transistor 72. The application of a positive reset pulse at the collector of 72 turns off transistor 62 and results in the termination of the wave from terminal 76 before its runs its normal predetermined time as established by resistors 79 and capacitor 78. This also results in an output being generated by pulse standardizer, including transistor 80 before the predetermined delay called for by the internal circuit arrangement of the resettable delay multivibrator.

*Theory of Operation*

Upon the initiation of the feeding operation of the document feeder, items 11, which are stored in the input hopper 12, will be transported along the document feed path 13. It has been assumed for purposes of description that two 5¾" length documents will be fed at such a rate so that they will be spaced, as measured from the leading edge of one item to the leading edge of the next following one, 40 milliseconds aparts, see FIG. 1*a*. For items of longer dimension a somewhat different interval or spacing between leading edges will exist, and a still different spacing will exist between succeeding items which are of different longitudinal dimensions. However, this unique document detecting apparatus will, and has, performed equally well under any combination of longitudinal dimensions for succeeding items. Therefore merely for purposes of description, and the example used should not be construed as a limitation, two suceeding items having longitudinal dimensions of 5¾", as shown in FIG. 1*a*, are assumed. Also as indicated above, the true item jam warning system will employ only BOL stations *b*, *c*, *e*, and *f*. Any jam which occurs at any other point in the document feed path will eventually affect the areas scanned by the above mentioned stations and so will also be detected. Also, as shown in FIG. 1*a*, the spacing between stations *b* and *c* and between *e* and *f*, is such that at the rate of item travel, assumed in this embodiment to be 400 inches per second, that the leading edge of an item will arrive as signal generating station *c* ($BOL_c$) 23.4 milliseconds after it has passed station $BOL_b$. The same standards are established between stations *e* and *f*. Therefore, for purposes of disclosure this description will be limited to an explanation of the events between signal generating stations *b* and *c*. It is obvious however that this explanation will also apply to signal generating stations *e* and *f*, as well as for any desired BOL positions.

Figure 6:
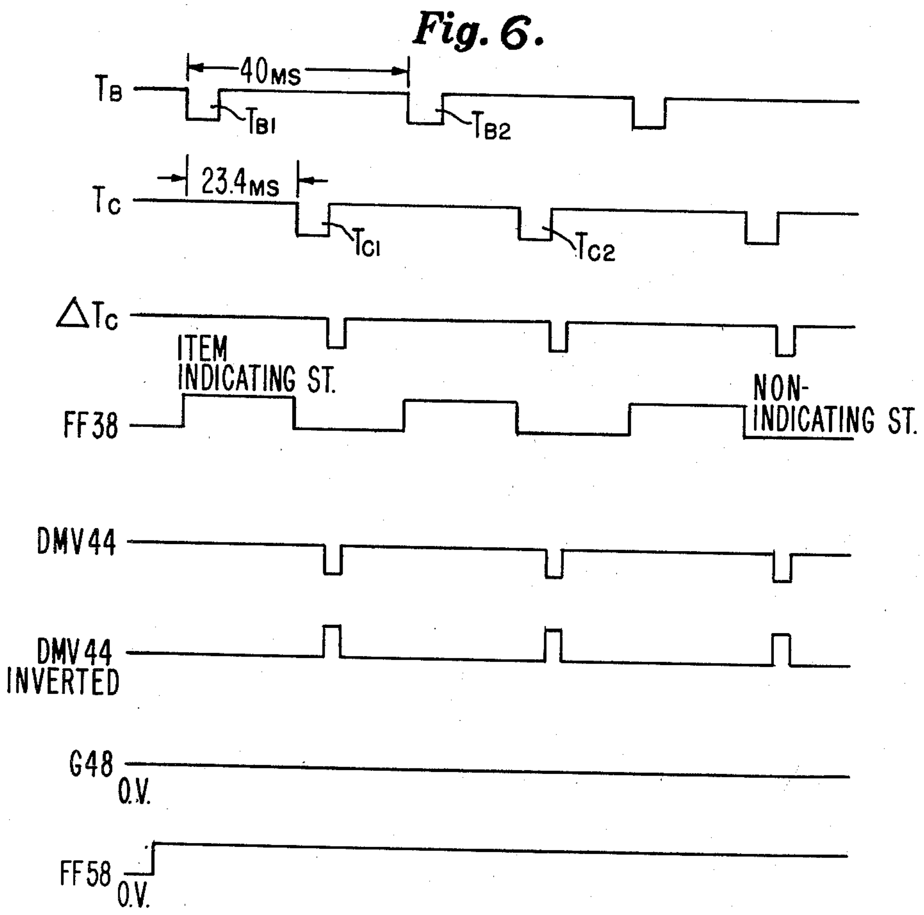
FIG. 6 is a timing diagram of the wave shapes which appear at various independent points in the system and illustrate the manner of operation of the various electrical components in a normal sorting operation with no jams occurring.

Reference is now made to FIG. 6 which illustrates the timing arrangement between wave forms at various points in the circuit of FIG. 4 for a normal, no jam, item feeding operation. In a properly functioning operation an item, which will be referred to as item 1, and succeeding ones as items 2, 3, etc., will be picked from item hopper 11, as shown in FIG. 1, and projected along the document feed path 13 at an initial rate of 150 inches per second. After the item passes the burst or accelerating roller 17 it is traveling at 400 inches per second. The item will then traverse signal generating station *b*, $BOL_b$, and a wave form $T_{b1}$ as shown in FIG. 6, and derived as explained in conjunction with the description above of FIG. 2, will be generated. This signal is applied to the logic circuitry as shown in FIG. 4 by way of the terminal marked 36. Furthermore, this signal generated by signal generating station $BOL_b$ will place bistable device 38 into a state, which is manifested at its output terminal, representing the presence of the item between signal generating stations $BOL_b$ and $BOL_c$. The device 38 will remain in this state until the item has continued down the document feed path and has passed the signal generating station $BOL_c$. Upon the item passing station $BOL_c$, a signal similar to that of $BOL_b$ will be generated. This is applied to the logic circuitry of FIG. 4 by way of terminal 34. Also, as shown thereat, the signal generated by $BOL_c$ is applied directly to the other input or reset terminal of bistable device 38 and is effective to return its output to its initial state. Therefore, it is seen that the output of 38 will be transferred from an initial to an opposite state ad remain in that state as long as an item remains between signal generating stations $BOL_b$ and $BOL_c$. Upon the item reaching $BOL_c$ the output of bistable device 38 will return to its initial state which signifies that the item has passed by the jam sensing area without a jam occurring. Therefore, a sampling or sensing of the output of bistable device 38 at the end of predetermined times, which are established by the speed and length of the document, and the distance between the signal generating stations, etc., will indicate if the item is still between the signal generating stations or if it has successfully passed by within that time.

In a normal sorting operation, as shown by the wave forms of FIG. 6 the $BOL_c$ signal, indicated by the $T_{c1}$ pulse for item 1, will not occur until 23.4 milliseconds after the generation of $T_{b1}$ by $BOL_b$. In the meantime, the $T_{b1}$ pulse has also been applied to the set terminal of resettable delay multivibrator 44. This circuit will delay the appearance of an output pulse for a predetermined time, at which time, under normal operating conditions, the item should have passed by both stations $BOL_b$ and $BOL_c$. Also as is shown in FIG. 4, the $T_{c1}$ signal generated by item 1 passing signal generating station $BOL_c$ is applied, after passing through the 25 microsecond delay unit 40 and inverter 42, to the reset terminal of signal delay device 44 to immediately cause the generation of an output pulse therefrom, regardless of whether or not it has delayed the $T_{b1}$ signal applied to it by way of terminal 36 for the predetermined 36 milliseconds. As mentioned above in a normal item feeding $T_{c1}$ will occur 23.4 milliseconds after the $T_{b1}$ signal has been applied to item signal delay circuit 44. Upon the generation of $T_{c1}$ resettable delay multivibrator 44 will immediately be reset and thereby emit an output pulse of 25 microseconds duration. Thus it can be seen that under no jam conditions unit 44 will not be permitted to delay an output pulse appearing at its output terminal for the full predetermined built in 36 milliseconds, but will be responsive to $T_{c1}$ pulses, applied to its reset terminal, to emit an output pulse 23.4 milliseconds after being set by $T_{b1}$.

Upon the appearance of a delayed $T_{b1}$ signal, whether the delay be for the full predetermined time or not, at the output terminal of resettable delay multivibrator 44, one input of the two input AND gate 48 is activated. Gate 48 will be responsive to emit an output pulse if, in addition, its other input, which is connected to bistable device 38, is also in a state representative of an item still being present between signal generating stations $BOL_b$ and $BOL_c$. In the case of a normal feed operation the $T_{c1}$ signal generated by $BOL_c$ will have reset the bistable device 38 to its initial state 25 microseconds before it caused the occurrence of an output signal at 44. Therefore, AND gate 48 will not generate an output pulse and no further operations will be performed by the true jam warning circuitry so that utilization device 58 will continue to permit the free feeding of items 11 from hopper 12 to the document feed path.

Reference is now made to FIG. 7 which depicts, by wave forms, the conditions which exist at various points in this system circuitry for a true item jam condition. The discussion of a true document jam condition is a continuation of the normal feed operation and will therefore be an extension of the above described normal feed description. It will be recalled that upon the transporting of an item past signal generating station $BOL_b$ the signal generated thereby will place the bistable device 38 in a state representative of the presence of an item between stations $BOL_b$ and $BOL_c$. At the same time signal $T_{b1}$ will also be delayed for a predetermined time by resettable delay multivibrator 44. Also as discussed above the passage of item 1 past station $BOL_c$ generates a signal $T_{c1}$, 23.4 milliseconds after it generated $T_{b1}$. $T_{c1}$ pulse not only resets bistable device 38 to its initial state, but also resets delay multivibrator 44 to emit an output pulse immediately upon the occurrence of signal $T_{c1}$ instead of in accordance with the predetermined delay preset in circuit 44.

However, if a true document jam should occur between stations $BOL_b$ and $BOL_c$, then a $T_{b1}$ signal will be generated by $BOL_b$, but there will not be generated a $T_{c1}$ pulse since item 1 will never reach signal generating station $BOL_c$. This condition is depicted in FIG. 7 by indicating $T_{c1}$ as a phantom pulse. Now, if $T_{c1}$ does not occur, then the output of flip flop 38 will remain in a state indicative of the presence of a check between stations $BOL_b$ and $BOL_c$. Also, resettable delay multivibrator 44 will not be reset, and it will emit an output pulse of standard width at the end of the predetermined time, which in this example is 36 milliseconds. The occurrence of an output pulse from multivibrator 44 enables one of the two inputs of AND gate 48. In the case of a true item jam, as has been explained above, there will be no $T_{c1}$ pulses generated, and, therefore, bistable device 38 will remain in its set state. Thus, since bistable device 38 is in its set state, which is indicative or representative of the presence of an item being between signal generating stations $BOL_b$ and $BOL_c$, its output is in a "high" or indicating state. The output of 38 is directly connected to the other input terminal of AND gate 48. Now since both inputs to gate 48 are enabled at the same time, AND gate 48 will emit an output pulse.

The output pulse from coincidence gate 48 in turn activates the second resettable delay multivibrator 50, by feeding the said input thereof. Resettable delay multivibrator 50 functions similarly to resettable delay multivibrator 44 but has a built-in predetermined delay of 55 milliseconds. Also, similar to the first resettable delay multivibrator 44, it has a reset terminal which is connected to receive $T_{c1}$ pulses by way of terminal 34 from signal generating station $BOL_c$ as they occur. However, in the case of a true jam between stations *b* and *c*, no items will pass station *c* and, therefore $T_{c1}$ will never be generated. Therefore, resettable delay multivibrator 50 will be permitted to delay emitting an output, after it has been initiated, for its full predetermined time. In this example multivibrator 50 will not emit an output until 55 milliseconds after it has been pulsed by a signal from AND gate 48.

At the end of this additional 55 millisecond delay, one input of AND gate 56 will be enabled and in turn will emit an output pulse, providing its other input is also in an enabling state. Since no $T_c$ pulses have been generated, it follows that the output of bistable device 38 will still be in its high or "item between signal generating stations $BOL_b$ and $BOL_c$" indicating state. The output of unit 50 being in a high state, therefore, sets up the proper conditions for both inputs of the two input AND gate 56, and thus will result in an output being generated by it. The output of AND gate 56 in turn will place the utilization device 58 in an off or set state which in turn can be utilized to disable the item feeder unit and thereby prevent further feeding of items along the document feed path 13.

Reference is now made to FIG. 8 which depicts, by wave forms, the conditions which exist at various points in the system circuitry for a false item jam condition. As was explained above it is a unique feature of this invention to provide circuitry which not only will detect true item jam conditions, and thereby initiate the utilization device to stop further feeding of items along the document feed path, but it also distinguishes from conditions which appear to be true item jams but which is reality are not. For example, it is possible that a piece of dust, dirt, or a bit of paper may come along the document feed path and intercept the light usually impinging upon the base of the signal generating station at $BOL_b$. This will result in a signal $T_b$ being generated by $BOL_b$ similarly to the condition which would exist if an actual document or item had passed thereby. This $T_b$ pulse will be fed over terminal 36 in FIG. 4 to the set side of bistable device 38, thereby placing the output of 38 into its high or document indicating position, and of course is indicative, under the normal operating conditions, of an item being located between signal generating stations $BOL_b$ and $BOL_c$. The probability of the same piece of paper or dirt which activated $BOL_b$, and which set flip flop 38 and initiated resettable delay multivibrator 44, similar to the operation which will occur in the case of a real item being transported along the document feed path, to generate a $T_c$ pulse and thereby reset both the bistable device 38 and the resettable multivibrator 4 are very small. The system will, therefore, have all of the indications that exist in the case of a true jam, and in the circuitry available heretofore, the feeding operations would be disabled even though the condition in reality is not a true jam situation. However, the unique circuitry which forms the basis of this application is able to determine that the conditions outlined above do not represent a true item jam condition and will not disable the item feeder control of item hopper 12.

The worst time that a non-item, such as dust, dirt, or bits of paper, could possibility occur at $BOL_b$ is immediately after an item has passed station $BOL_c$, and thus has generated a $T_c$ pulse for resetting elements 38 and 44. This is obvious, for if the non-item occurs after an item has passed $BOL_b$ but before it has passed station $BOL_c$, then the non-item will try to place flip-flop 38 and resettable multivibrator 44 into their set states. However, they have already been placed in their set states by the $T_b$ pulse of the real item, and so the false item will have no effect. However, if an item has passed both stations $BOL_b$ and $BOL_c$, then a $T_b$ pulse has occurred, which initiates or sets elements 38 and 44, and a $T_c$ pulse has also been generated to reset elements 38 and 44 to their initial states. Now should a false item happen to pass $BOL_b$, a $T_b$ pulse will be generated to once again "set" elements 38 and 44. Therefore, to the machine, it again appears as if an item has passed station $BOL_b$ and, if the same false item does not also generate a $T_c$ pulse, then a true item jam condition will have been simulated. In the item detecting devices utilized heretofore a situation as described would have resulted in a shut off or the document feeder; however; however, by use of my unique detecting circuitry means are provided whereby the above situation will be recognized as a false-item jam and a machine shut-down will not occur.

FIG. 8 depicts a false $T_b$ pulse being generated immediately after the $T_{c1}$ pulse has been generated, and as is shown by the wave form depicting the conducting or non-conducting state of flip flop 38 and delay multivibrator 44, and labeled as such thereat, it can be seen that the false $T_b$ pulse will return these aforesaid units to their conducting state i.e., in which flip-flop 38 is set and delay multivibrator 44 starts to time out again. Now, as is further shown by FIG. 8, the real or true items will continue to come along in their normal sequence, thereby generating pulses $T_{b2}$ and $T_{c2}$ in due course. The generation of $T_{b2}$ by item 2 is of no consequence, since flip flop 38 and delay multivibrator 44 are already in their set states due to the false $T_b$ pulse. Also, it is clear from a study of the wave form $T_c$ and "false $T_b$" that the true $T_{c2}$ pulse will not be generated until almost 40 milliseconds after the false $T_b$ pulse, and by that time delay multibrator 44 will have emitted an output in response to it previously being placed in a set state by the false $T_b$ pulse.

The output from delay multivibrator 44 after being inverted by inverter 44 enables one of the inputs of AND gate 48. The other input of AND gate 48, which is connected to the output of flip flop 38, is also enabled at the time that delay multivibrator 44 emits an output, because it was placed into a set state indicative of an item being present between stations $BOL_b$ and $BOL_c$ by the false $T_b$ pulse, and it has not been reset as yet by the generation of a true $T_{c2}$ pulse by the next succeeding item. Since both inputs to AND gate 48 are in a high or enabling condition, it will be responsive to them to emit an output pulse depicted in FIG. 8 as G48.

The ouput of AND gate 48 is then fed to the set input terminal of delay multivibrator 0 and thereby triggers it into conduction. Now in the case of a true item jam condition, any items which are fed from the item feeder after a jam will be blocked by the jammed items and so will not be able to generate $T_c$ pulses. But in the case of a false jam condition, no obstacles are present to subsequent items, and therefore they will be able to be transported past stations $BOL_b$ and $BOL_c$. Therefore, a $T_{c2}$ pulse will be generated a few milliseconds after delay multivibrator 50 was set by a pulse from AND gate 48 and will reset the aforesaid delay multivibrator 50 to immediately emit a pulse therefrom. This pulse is depicted by the wave form labeled "DMV50". $T_{c2}$ also is effective to reset flip flop 38 in to a non-item indicating position. Similarly to the description above, the output pulse from delay multivibrator 50 enables one input of the two input AND gates 56. However, at the time of its occurrence, flip flop 38 has been reset to its low state, and therefore both inputs to AND gate 56 are not enabled. These conditions will not enable AND gate 56, and, therefore no output pulse will be emitted therefrom. Also since AND gate 56 has not generated, the output pulse utilization device 58 remains undisturbed and continues to permit items to be fed from item hopper 12 to document feed path 13.

In this example of a false item jam condition the false item was assumed, arbitrarily, to occur at the worst time; namely, after a $T_c$ pulse had been generated by a true item. However, it should be clear that this condition was set up merely for illustrative purposes and the circuit will perform to discriminate between false jam conditions regardless of where or when they occur.

While this specification has described, in considerable detail, a typical embodiment of the invention, it should be indicated that the description is intended to be merely illustrative. Many changes in manner of detail may be made in this application by persons skilled in the art without departing from the spirit of the invention.

What is claimed is:

1. In an item transport system having an item feeder for feeding of spaced items at a predetermined speed along an item transport path, an item feeder control system comprising a first signal generating station positioned along the item transport path and generating an output signal in response to an item passing thereby, a second signal generating station positioned posteriorly to the first station with respect to the direction of item travel along the transport path and emitting an output signal in response to the item passing thereby, a bistable means having a pair of inputs electrically connected to said first and second signal generating stations and an output signalling a change from a first state to a second state in response to an input signal from said first signal generating station signifying the presence of an item between said first and said second signal generating stations and a change from its second state back to its first state in response to an input signal from said second signal generating station signifying the passage of an item from between the signal generating stations, a first delayed action means having a pair of inputs electrically connected to said first and said second signal generating stations and an output emitting a delayed output pulse therefrom a predetermined time after receipt of an input signal from said first signal generating station upon the failure to receive an input signal from said second signal generating station prior in time to the expiration of the predetermined time of delay of the first delayed action means, a first coincidence sensing gate having a pair of inputs electrically connected to the outputs of said first delayed action means and said bistable means and an output emitting an output pulse in response to the coexistence of an output pulse from said first delayed action means at the time said bistable means is in its second state, a second delayed action means having a pair of inputs electrically connected to said first coincidence sensing gate and to said second signal generating station and an output emitting a delayed output pulse therefrom a predetermined time after receipt of the gated output from said first coincidence sensing gate upon the failure to receive an input signal from said second signal generating station prior in time to the expiration of the predetermined time of delay of the second delayed action means, a second coincidence sensing gate having a pair of inputs electrically connected to the outputs of said bistable means and said second delayed action means and an output emitting an output pulse in response to the existence of an output pulse from said second delayed action means at the time said bistable means is in its second state, and an item feeder controlling utilization means connected to the output of said second coincidence gate and responsive to said output pulse from the second coincidence gate to disable the item feeder and prevent further feeding of items therefrom.

2. The combination as described in claim 1 wherein the predetermined time delay of said first delayed action means is of a duration substantially longer than the time of travel of the item between the first and second signal generating stations.

3. The combination as described in claim 1 wherein the predetermined time delay of said second delayed action means is of a duration substantially longer than that of said first delayed action means.

4. The combination as described in claim 1 wherein the predetermined time delay of said second delayed action means is of a duration substantially more than twice the time of travel of an item between the first and second signal generating stations.

5. The combination as described in claim 1 wherein the combined times of delay of said first and second delayed action means is greater than the time of travel of a second item to reach the second signal generating station as measured from the time an immediately preceding first item reaches the first signal generating station.

6. The combination as described in claim 1 including a fixed delay element electrically connected between the second signal generating station and the second station inputs of said first and second delayed action means to delay the application of a second station signal to the first and second delayed action means in relation to the application of the second station signal to said bistable means.

7. In an item feed and transport system for feeding and transporting spaced items at predetermined speed along a feed path, an item feeder control system comprising first and second monitoring detecting stations spaced along the feed path each generating a signal in response to the detection of an item transported thereby; a first bistable control means having a pair of input terminals each connected to a different one of said monitoring stations and an output settable in response to an input signal from said first monitoring station and resettable in response to an input signal from said second monitoring station; a fixed delay element connected to said second monitoring station; a first delay multivibrator having a set terminal connected to said first monitoring station, a reset terminal connected to said fixed delay element, and an output terminal; a first coincidence gate connected to and gating the outputs of said first bistable control means and said first delay multivibrator; a second delay multivibrator having a set terminal connected to receive the gated output of said first coincidence gate, a reset terminal connected to said fixed delay element, and an output terminal; a second coincidence gate connected to and gating the outputs of said first bistable control means and said second delay multivibrator; and a utilization means receiving the gated output of said second coincidence gate and controlling the feeding of said item feeder.

8. In an item transport system in which spaced items are fed sequentially by an item feeder along a path of travel having spaced first and second item monitoring and signal generating stations, an item feeder control system comprising a bistable switching means having a pair of inputs electrically connected to said first and second signal generating stations and an output signalling a change from a first state to a second state in response to an input signal from said first generating station signifying the presence of an item between said first and said second stations and a change from its second state back to its first state in response to an input signal from said second signal generating station signifying the passage of the item thereby, a first delay multivibrator having an input responsive to a signal from said first signal generating station and an output emitting an output pulse a predetermined time thereafter, a first comparator means having a pair of inputs electrically connected to the outputs of said bistable switching means and said first delay multivibrator and an output emitting an output pulse if the bistable switching means is in its second stable state at the time that said first delay multivibrator device emits an output pulse therefrom, a signal delay element having an input connected to said second signal generating station and an output, a second delay multivibrator having a pair of inputs electrically connected to the outputs of said first comparator means and said signal delay element and an output emitting an output pulse therefrom a predetermined time after receipt of said output pulse from said first comparator means, and a second comparator means having a pair of inputs electrically connected to the outputs of said bistable switching means and said second delay multivibrator and an output controlling the item feeder to prevent feeding of items therefrom if said bistable switching means is still in its second stable state at the time of occurrence of an output pulse from said second delay multivibrator.

9. In an item feed and transport system for feeding and transporting spaced items along a feed path and having an item feeder control and first and second monitoring stations spaced along the feed path, apparatus for discriminating against a feed termination signifying condition produced by a false item phenomenon occurring between an adjacent pair of spaced items being fed along the item feed path and occasioned by the failure to detect at the second monitoring station a fed item which has been detected at the first monitoring station spaced anteriorly of the second monitoring station along the item feed path, said apparatus comprising means detecting the passage of each item at said first and second monitoring stations and producing, in the event that an item detected at said first monitoring station has been undetected at the second monitoring station, a signal signifying that event after a period of time greater than that required for an item to pass from one monitoring station to the other, means ascertaining whether the item causing the undetected item signal a false item producing a feed termination signifying condition that is to be disregarded or an impeded true item producing a feed termination signifying condition that is to be regarded including means receiving and storing the aforesaid signal for an additional period of time which, when added to the time that said signal is produced after the item which produces it has been detected at the first monitoring station, is greater than the time required for the next item to reach the second monitoring station as measured from the time that the first mentioned item has been detected at said first monitoring station, means producing another signal if the said next item has reached and been detected at the second monitoring station, and comparison means responsive to said last named means and said storing means and disabling the item feeder control to prevent feeding of items if the last named signal signifying the detection of the said next item at the second monitoring station fails to occur prior in time to the combined times of occurrence and storage of said first mentioned signal as measured from the time the first mentioned item is detected at the first monitoring station.

10. In an item feed and transport system for feeding and transporting spaced documents along a feed path and including an item feeder control and first and second monitoring stations spaced along the feed path, means for discriminating against a feed termination signifying condition produced by a false item phenomenon occurring between an adjacent pair of spaced items being fed along the item feed path and occasioned by the failure to detect at the second monitoring station an item which has been detected at the first monitoring station spaced anteriorly of the second monitoring station along the item feed path, comprising means detecting the passage of each item at said first and second monitoring stations, first delay means responsive to the detection of an item at said first monitoring station and producing a signal signifying that event after a period of time greater than that required for the item to pass from one monitoring station to the other, second delay means coupled to said first delay means and delaying the said signal therefrom for an additional period of time which, when added to the time that said signal is produced after the item which produces it has been detected at the first monitoring station, is greater than the time required for the next item to reach the second monitoring station commencing from the time the first mentioned item has been detected at said first monitoring station, bistable control means set in one condition in response to the detection of an item at said first station and reset to its other condition in response to the detection of an item at said second station, and comparison means coupled to said bistable control means and said second delay means and producing a feed termination signifying condition if the bistable control means remains in its set condition at the expiration of the additional time delay period of said second delay means.

References Cited in the file of this patent

UNITED STATES PATENTS

| | | |
|---|---|---|
| 2,996,630 | Bensema | Aug. 15, 1961 |
| 3,020,788 | Peters | Feb. 13, 1962 |
| 3,046,538 | Pedersen | July 24, 1962 |

UNITED STATES PATENT OFFICE

CERTIFICATE OF CORRECTION

Patent No. 3,150,873 September 29, 1964

Morris MacGregor

It is hereby certified that error appears in the above numbered patent requiring correction and that the said Letters Patent should read as corrected below.

Column 1, line 16, after "jam" strike out the comma; lines 45 and 46, for "segnal" read -- signal --; column 3, line 48, for "terminals" read -- terminal S --; column 5, line 24, for "its", first occurrence, read -- it --; line 39, for "aparts" read -- apart --; line 59, for "as" read -- at --; column 6, line 22, for "ad" read -- and --; column 8, line 12, for "is" read -- in --; line 31, for "4" read -- 44 --; same column 8, line 62, for "feeder; however; however," read -- feeder; however, --; column 9, line 24, for "O" read -- 50 --; column 12, line 6, after "signal" insert -- is --.

Signed and sealed this 23rd day of February 1965.

(SEAL)

Attest:

ERNEST W. SWIDER
Attesting Officer

EDWARD J. BRENNER
Commissioner of Patents